No. 896,708. PATENTED AUG. 25, 1908.
G. H. BRUCE.
COOKING UTENSIL.
APPLICATION FILED JAN. 20, 1908.

2 SHEETS—SHEET 1.

Witnesses

Inventor
George H. Bruce.
By C. A. Snow & Co
Attorneys

No. 896,708. PATENTED AUG. 25, 1908.
G. H. BRUCE.
COOKING UTENSIL.
APPLICATION FILED JAN. 20, 1908.

2 SHEETS—SHEET 2.

Witnesses
Inventor
George H. Bruce,
By C. A. Snow & Co.
Attorneys

UNITED STATES PATENT OFFICE.

GEORGE HENRY BRUCE, OF SAUGUS, MASSACHUSETTS.

COOKING UTENSIL.

No. 896,708.　　　　Specification of Letters Patent.　　Patented Aug. 25, 1908.

Application filed January 20, 1908.　Serial No. 411,780.

*To all whom it may concern:*

Be it known that I, GEORGE H. BRUCE, a citizen of the United States, residing at Saugus, in the county of Essex and State of Massachusetts, have invented a new and useful Cooking Utensil, of which the following is a specification.

This invention relates to cooking utensils; and has for its object to provide an article in which several kinds of food, each differing from the other, may be simultaneously cooked either by boiling or steaming, or some by boiling and others by steaming.

The invention is so designed that it may be placed in kettles of different sizes and thus give the utensil a greater range of usefulness. When in place, the kettle is closed and steam and odors are prevented in a great measure from escaping.

With these and other objects in view, the invention consists of the novel construction, combination and arrangement of parts, hereinafter described and claimed, reference being had to the accompanying drawing, in which—

Figure 1:
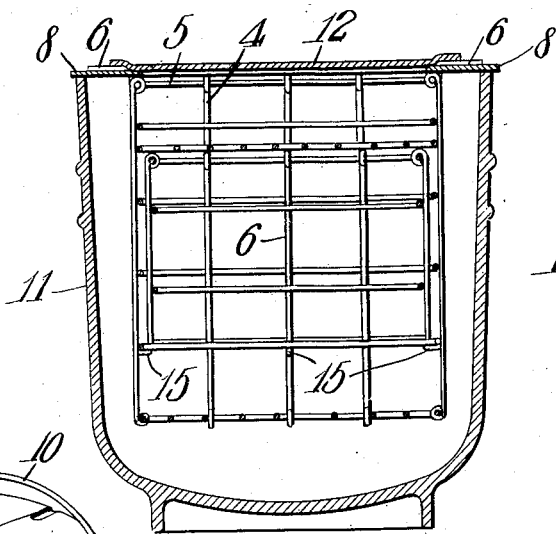
Figure 2:
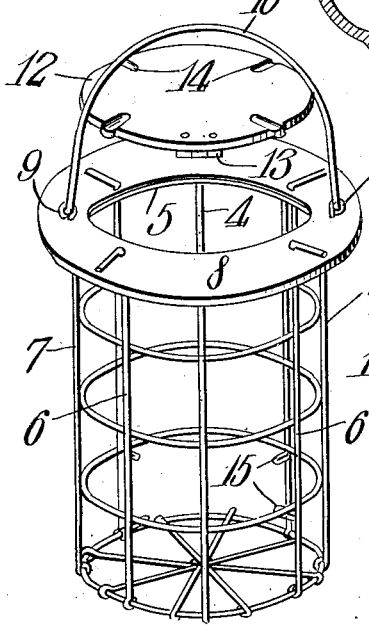
Figure 3:
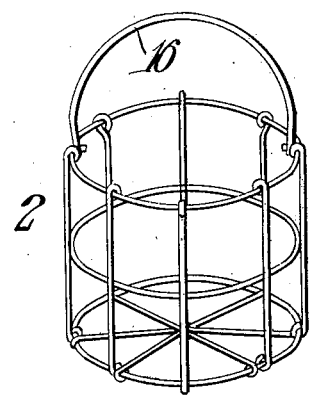
Figure 4:
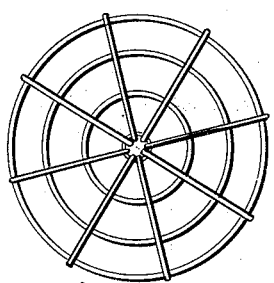
Figure 5:
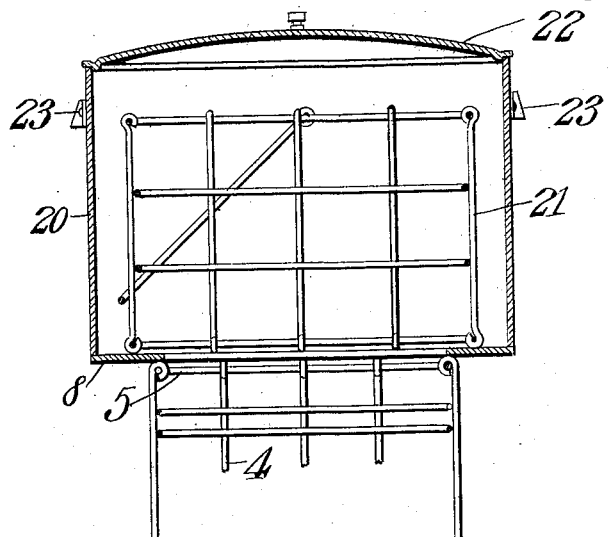
Figure 6:
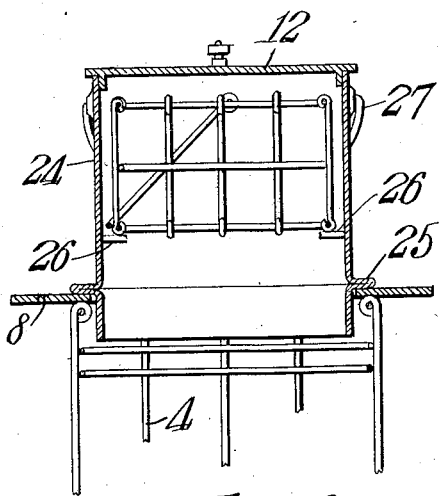

Figure 1 is a vertical central sectional view of the improved utensil inserted in a second utensil capable of holding water. Fig. 2 is a perspective view of the main food receptacle. Fig. 3 is a similar view of the secondary food vessel. Fig. 4 is a plan view of a foraminous disk to be used as a shelf. Fig. 5 is a sectional view showing a modified form of construction. Fig. 6 is a like view of a further modification.

Similar reference numerals are used for the same parts in all the figures.

The numeral 1 indicates a cylindrical outer or main food receptacle, 2 the inner basket or secondary vessel, also cylindrical, and 3 a flat disk-like shelf on which food is to be placed for steaming or boiling. These parts may be made of perforated sheet metal, woven wire folded and stamped into shape, or of shaped strands of wire or vertical wire ribs connected together substantially in the manner shown in the drawing, the number of horizontal strands and vertical wire ribs increasing with the size of the several parts. At the top of receptacle 1, the terminals of vertical wires 4 are wrapped around a horizontal wire ring 5. Four other vertical wires 6, equally spaced one from another, after a turn around the wire ring extend a short distance beyond it. Besides the wires 6, two other vertical wires 7, oppositely disposed, also extend upwardly above the ring 5.

8 is a flat disk-like ring of imperforate sheet metal, the inner diameter of which is slightly less than that of the receptacle 1 and through this ring are holes corresponding in number and position to the upwardly projecting wires 6 and 7, which are placed in said holes and the flat ring 8 brought downwardly until it rests on the wire ring 5. The wires 6 are then bent outwardly on the flat ring 8 in a radial direction and fastened with solder or by other suitable means. The two oppositely disposed wires 7 are, however, bent into eyes 9 to receive the ends of a bail 10 by means of which the receptacle 1 is lifted and moved about. The external diameter of the flat ring 8 is somewhat greater than the receptacle 1 and overhangs it, so that the receptacle may be placed in kettles 11 of different sizes.

A cover 12 is supplied for closing the opening in the flat disk ring 8 which may be hinged to said ring, as at 13 in the drawing, or be independent thereof and provided with a downwardly extending flange to enter the opening in the ring in a manner well understood. Any form of fastening may be used to hold the cover in place, or its weight may be sufficient to prevent lifting by steam pressure. Slight depressions 14 in the underside of the cover may be made to arch over the bent ends of the wires 6, so that the cover will rest flat on the ring 8.

Near the bottom of the receptacle 1 are fastened a plurality of inwardly projecting studs 15 in the same plane, which support the vessel or basket 2, or the shelf 3. The studs 15 are sufficiently high above the bottom of the receptacle to give enough space when the basket or shelf is in place on said studs to hold food to be cooked. The inner vessel or basket 2 may be made of similar material as that of the receptacle 1, or of some other foraminous material, as preferred. It is of less diameter and height than the receptacle, so that it may pass easily through the opening in the flat ring 8 and, while supported on the studs 15, a sufficient space will be left for food between the top of the basket and the flat ring 8. Food to be cooked in this space will be supported on the shelf 3 resting on the top of the basket. A bail 16 is applied to the basket 2 to facilitate its insertion into and removal from the receptacle, said bail resting on the upper edge of the basket 2 when folded.

In use, food to be boiled is placed in the receptacle 1, other food to be boiled or steamed is put into the basket 2, and the latter into the receptacle resting on the studs 15. If a third article is to be cooked by steam, the shelf 3 is inserted into the receptacle and on the top of the basket, after which the third article is placed on the shelf and the cover 12 closed. The receptacle is then placed in a kettle large enough to receive it, the size of the flat ring being such as to permit kettles of different diameters being used. Care must be taken to keep the bottom of the receptacle a short distance above the bottom of the kettle. If the food in the basket is to be cooked by boiling, sufficient water will be placed in the kettle to cover it, but if it is to be steam cooked, the height of the water will be below the studs 15. It is to be noted that the kettle is entirely closed, partly by the flat ring and partly by the cover, so that steam and odors from the cooking vegetables will not escape from the kettle. If more convenient, when two articles of food only are to be cooked, the shelf 3 may be placed on the studs for the food and the basket entirely dispensed with.

While the means for connecting the flat disk to the receptacle has been described in connection with the particular construction shown, when made of other material the receptacle may be connected to the disk in the same manner or in any other well known way.

When a larger variety or amount of foods are to be cooked than can be accommodated in the utensil represented by Fig. 1, its capacity may be increased by permanently fastening an imperforate cylinder 20 to the flat ring 8 and extending it as high as desired above said flat ring. As shown in Fig. 5, the inner vessel or basket 21 rests on the flat ring 8 and the whole is covered by an ordinary tin cover 22. In place of the basket 21 a shelf similar to shelf 3, but of greater diameter, may be placed on the flat ring 8. If a bail be not fastened to the top of the imperforate cylinder 20, handles 23 may be substituted for the bail.

Should only a temporary enlargement of the capacity of the cooker be desired, an imperforate cylinder 24 of such diameter as will enter the opening in the flat ring 8 is employed, see Fig. 6, having an outwardly projecting bead 25 formed on the cylinder 24 near the lower end to rest on the ring 8 and support the cylinder. Lugs 26 project inwardly from the cylinder 24 to support a basket 2 or shelf 3. If the cover 12 which closes the opening in the flat disk ring 8 be a flanged one it may be employed to cover the cylinder 24, or an ordinary cover may be used. A bail 27 is hinged near the top of the cylinder for lifting the same.

I claim:—

1. A cooking utensil comprising a foraminous receptacle, a flat disk like ring fastened to the upper open end of said receptacle, an imperforate cylindrical receptacle adapted to enter the opening in said flat ring having an exterior bead near its lower end to support said imperforate receptacle, projections on the inner surface of each receptacle, a basket for inserting in each receptacle to rest on said projections, a foraminous shelf to cover one of said baskets, and a cover adapted to form a closure for either receptacle.

2. A cooking utensil comprising a foraminous receptacle having an outwardly extending flange on its upper end, an imperforate open receptacle adapted to enter and fit closely the upper open end of said foraminous receptacle, means on said imperforate receptacle for holding the same partly above said imperforate receptacle, supporting means on the inner surface of each receptacle above the bottom thereof, a basket adapted to be inserted in either receptacle and rest on said supporting means, and a removable cover capable of closing either receptacle.

3. A cooking utensil comprising a receptacle having vertical wire ribs, a flat disk-like ring fastened to the top of said receptacle by a number of said ribs passing through holes in said flat ring and bent down thereon and fastened, and a bail pivoted to other ribs extending through said flat ring and bent to form eyes.

In testimony that I claim the foregoing as my own, I have hereto affixed my signature in the presence of two witnesses.

GEORGE HENRY BRUCE.

Witnesses:
 ABBIE D. WHITCOMB,
 ELLA M. BRUCE.